(12) United States Patent
Suzuki et al.

(10) Patent No.: US 7,906,584 B2
(45) Date of Patent: Mar. 15, 2011

(54) POLYMER COMPOSITION

(75) Inventors: Kenji Suzuki, Ibaraki (JP); Akihiro Kotaka, Ibaraki (JP); Kenji Shachi, Ibaraki (JP); Mizuho Maeda, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 398 days.

(21) Appl. No.: 10/531,307

(22) PCT Filed: Oct. 20, 2003

(86) PCT No.: PCT/JP03/13378
§ 371 (c)(1),
(2), (4) Date: Apr. 13, 2005

(87) PCT Pub. No.: WO2004/037922
PCT Pub. Date: May 6, 2004

(65) Prior Publication Data
US 2006/0052534 A1 Mar. 9, 2006

(30) Foreign Application Priority Data
Oct. 24, 2002 (JP) .................. 2002-309748

(51) Int. Cl.
C08L 53/02 (2006.01)
C08L 33/08 (2006.01)
C08F 297/04 (2006.01)

(52) U.S. Cl. .......................... 525/93; 525/98
(58) Field of Classification Search ............ 525/93, 525/98
See application file for complete search history.

(56) References Cited

U.S. PATENT DOCUMENTS

| | | | |
|---|---|---|---|
| 3,661,620 A * | 5/1972 | Dekking et al. ............ | 427/221 |
| 3,679,776 A * | 7/1972 | Foss .................. | 525/386 |
| 3,737,482 A | 6/1973 | Kelly et al. | |
| 5,219,961 A * | 6/1993 | Zucchini et al. ........ | 526/124.9 |
| 5,317,059 A * | 5/1994 | Chundury et al. ......... | 525/66 |
| 5,380,616 A * | 1/1995 | Aoki et al. ............ | 430/110.1 |
| 6,414,059 B1 * | 7/2002 | Kobayashi et al. ........ | 524/101 |
| 6,525,142 B1 * | 2/2003 | Erickson et al. ......... | 525/314 |
| 7,247,674 B2 * | 7/2007 | Kitano et al. .......... | 525/93 |
| 2006/0177652 A1 * | 8/2006 | Khandpur et al. ......... | 428/343 |

FOREIGN PATENT DOCUMENTS

| | | |
|---|---|---|
| JP | 03-70761 | 3/1991 |
| JP | 05-230322 | 9/1993 |
| JP | 05-295216 | 11/1993 |
| JP | 05-345841 | 12/1993 |
| JP | 6-279646 | 10/1994 |
| JP | 6-329865 | 11/1994 |
| JP | 8-157681 | 6/1996 |
| JP | 10-511418 | 4/1998 |
| JP | 2001-158812 | 6/2001 |
| JP | 2001-316537 | 11/2001 |

OTHER PUBLICATIONS

Hiiro, electronic translation of JP 11-246733, Sep. 1999.Anonymous, Chemical Marketing Reporter, Jan. 31, 2000; 257, 5, p. 16.*
Toshinori, translation of JP 03-070761, Mar. 1991.*

* cited by examiner

*Primary Examiner* — Jeffrey C Mullis
(74) *Attorney, Agent, or Firm* — Oblon, Spivak, McClelland, Maier & Neustadt, L.L.P.

(57) ABSTRACT

The invention provides a polymer composition containing an addition polymerization-based block copolymer (a), an acrylic resin (b), and a softener (c), wherein the addition polymerization-based block copolymer (a) has a weight average molecular weight of 30000 to 200000 and is at least one selected from block copolymers comprising at least one polymer block A and at least one polymer block B, and hydrogenated products of the block copolymers; the polymer block A essentially comprises an aromatic vinyl compound unit containing at least 1% by mass of an alkylstyrene-derived structural unit (I) in which at least one alkyl group having 1 to 8 carbon atoms is bound to a benzene ring; the block copolymer B comprises a conjugated diene compound unit; and the components of the polymer composition are present in respective proportions (by mass) so that the following relationships (1) and (2) hold:

$$0.05 \leq Wb/Wa \leq 2 \quad (1)$$

$$Wc/(Wa+Wb+Wc) \leq 0.5 \quad (2)$$

where Wa, Wb, and Wc are the amounts (by mass) of the components of the polymer composition: the addition polymerization-based block copolymer (a), the acrylic resin (b) and the softener (c), respectively.

Not only does the polymer composition of the present invention offer various advantageous properties, including moldability, flexibility, rubber elasticity, mechanical properties, and transparency, but it also exhibits superior scratch resistance and superior abrasion resistance, which make the polymer composition suitable for use in various applications.

5 Claims, No Drawings

POLYMER COMPOSITION

TECHNICAL FIELD

The present invention relates to a polymer composition containing a thermoplastic elastomer and an acrylic resin in which the thermoplastic elastomer is an addition polymerization-based block copolymer with its hard segment being a polymer block A that essentially comprises an aromatic vinyl compound unit containing at least 1% by mass of an alkylstyrene-derived structural unit (I) in which at least one alkyl group having 1 to 8 carbon atoms is bound to a benzene ring.

The polymer composition of the present invention has many advantageous properties, including moldability, flexibility, rubber elasticity, mechanical properties, and transparency, and especially is excellent in scratch resistance and abrasion resistance. The polymer composition of the present invention can be used in a wide range of applications.

TECHNICAL BACKGROUND

Thermoplastic elastomers exhibit rubber elasticity at room temperature and are easy to mold since they are readily plasticized and melted upon heating. Thermoplastic elastomers are also recyclable. These features have made the thermoplastic elastomers widely used in a range of applications, including automobile parts, parts of home electric appliances, construction materials, sports equipment and articles of daily use.

Among different thermoplastic elastomers, styrene-based thermoplastic elastomers, such as polystyrene-polybutadiene-polystyrene (SBS) block copolymers, polystyrene-polyisoprene-polystyrene (SIS) block copolymers and hydrogenated products of these block copolymers, are particularly widely used since they are inexpensive, have high flexibility and rubber elasticity, and are readily recyclable.

Several proposals have been made to improve different physical properties of styrene-based thermoplastic elastomers. One example is a thermoplastic elastomer resin composition (1) for use in powder molding (See, Japanese Patent Application Laid-Open No. 2001-158812). This composition is intended for use in the production of molded articles with soft texture and high scratch resistance and contains a styrene-based thermoplastic elastomer and a polyurethane-based thermoplastic elastomer, among other components. Another proposal is a thermoplastic elastomer composition (2) (See, Japanese Patent Application Laid-Open No. Hei 5-230322). This composition offers high flexibility, moldability and scratch resistance and is formed by adding, to a composition composed of a styrene-based thermoplastic elastomer (hydrogenated block copolymer) and an acrylic resin, a copolymer including units compatible to each of the two components.

Also, several thermoplastic resin compositions have been proposed that retain surface properties, such as surface hardness, weather resistance, as well as transparency and other characteristics of acrylic resins and at the same time exhibit flexibility and low temperature properties. One example of such thermoplastic resin compositions is an acrylic thermoplastic resin composition (3) (See, Japanese Patent Application Laid-Open No. Hei 6-329865). This composition contains a hydrogenated product of a block copolymer and an acrylic resin with a particular intrinsic viscosity in predetermined proportions. The block copolymer contains polymer blocks of a particular molecular weight formed of a vinyl aromatic compound and polymer blocks composed of isoprene or isoprene and butadiene. Another example is a thermoplastic resin composition (4) (See, Japanese Patent Application Laid-Open No. Hei 5-295216). This composition contains, in predetermined proportions, an acrylic resin and a hydrogenated product of a triblock copolymer that has a particular number average molecular weight and containing blocks of an aromatic vinyl monomer and blocks of isoprene and/or butadiene. A thermoplastic resin composition (5) has also been proposed that exhibits high flexibility and weather resistance and offers a favorable appearance (See, Japanese Patent Application Laid-Open No. Hei 5-345841). This composition contains (i) a polyolefin resin; (ii) a hydrogenated product of a thermoplastic block copolymer composed of blocks of aromatic vinyl monomer and blocks of isoprene and/or butadiene; (iii) an acrylic resin; (iv) a hydrocarbon-based softener; and (v) a hydrogenated product of a thermoplastic block copolymer having a polymer side chain of acrylic monomer and composed of blocks of aromatic vinyl monomer and block of isoprene and/or butadiene.

While the composition (1) has an improved scratch resistance, though not as high as that of the polyurethane-based thermoplastic elastomer, the poor hydrolysis resistance and poor weather resistance of the composition make articles molded from the composition susceptible to performance deterioration and yellowing. The compositions (2) through (5) each retain surface properties, such as surface hardness, as well as weather resistance, transparency, and other characteristics of acrylic resins, while exhibiting high flexibility, high moldability, and high transparency. Nonetheless, each has its own drawback. Specifically, the composition (2) was tested for the scratch resistance according to JIS Z 8741 by rubbing 100 times with a No. 3 cotton cloth while a 500 g load was applied. The results of the test were given as the difference in the gloss of the sample before and after the test. The composition (5) was subjected to the pencil scratch test according to JIS K 5400. These tests demonstrated that neither of the compositions had sufficient scratch resistance nor abrasion resistance. As far as the abrasion resistance of the compositions (3) and (4) is concerned, nothing was mentioned in the respective publications. Thus, a demand exists for a thermoplastic polymer composition that is suitable for use in applications where it is subjected to frequent friction and aesthetic appearance is important.

Accordingly, it is an object of the present invention to provide a polymer composition that has high moldability, flexibility, rubber elasticity, mechanical properties, and transparency and at the same time exhibits scratch resistance and abrasion resistance comparable to polyurethane-based thermoplastic elastomers and polyester-based thermoplastic elastomers.

The present inventors have devoted significant effort to finding a way to achieve the above-described object and, as a result, have made a finding that by adjusting the proportions of components of a polymer composition that comprises an addition polymerization-based block copolymer, an acrylic resin and, if necessary, a softener, the addition polymerization-based block copolymer forms a continuous phase (matrix) with the acrylic resin dispersed throughout it, forming an sea-island structure (morphology). The addition polymerization-based block copolymer is such that it has a hard segment that is a polymer block A that essentially comprises an aromatic vinyl compound unit containing at least 1% by mass of an alkylstyrene-derived structural unit (I) in which at least one alkyl group having 1 to 8 carbon atoms is bound to a benzene ring.

The present inventors examined the physical properties of the polymer composition and articles molded from the polymer composition and found that the polymer composition is highly moldable and has many advantageous properties, including flexibility, rubber elasticity, mechanical properties, transparency, and, in particular, scratch resistance and abrasion resistance. The polymer composition of the present invention has these properties in a well-balanced manner, which makes the polymer composition suitable for use in various applications. This finding led the present inventors to devise the present invention.

DISCLOSURE OF THE INVENTION

Specifically, the present invention provides a polymer composition containing an addition polymerization-based block copolymer (a), an acrylic resin (b), and a softener (c) in respective proportions (by mass) so that the following relationships (1) and (2) hold:

$$0.05 \leq Wb/Wa \leq 2 \quad (1)$$

$$Wc/(Wa+Wb+Wc) \leq 0.5 \quad (2)$$

where Wa, Wb, and Wc are the amounts (by mass) of the respective components of the polymer composition: the addition polymerization-based block copolymer (a), the acrylic resin (b), and the softener (c). The addition polymerization-based block copolymer has a weight average molecular weight of 30000 to 200000 and is at least one selected from block copolymers comprising at least one polymer block A and at least one polymer block B, and hydrogenated products of the block copolymers. The polymer block A essentially comprises an aromatic vinyl compound unit containing at least 1% by mass an alkylstyrene-derived structural unit (I) in which at least one alkyl group having 1 to 8 carbon atoms is bound to a benzene ring. The block copolymer B comprises a conjugated diene compound unit.

BEST MODE FOR CARRYING OUT THE INVENTION

The present invention will now be described in detail.

The addition polymerization block copolymer (a) for use in the polymer composition of the present invention has a weight average molecular weight of 30000 to 200000 and is at least one selected from block copolymers that include at least one polymer block A and at least one polymer block B, and hydrogenated products of the block copolymers. The polymer block A essentially comprises an aromatic vinyl compound unit containing at least 1% by mass of a certain structural unit (I). The polymer block B comprises a conjugated diene compound unit.

The structural unit (I) is composed of an alkylstyrene that includes on its benzene ring at least one alkyl group having 1 to 8 carbon atoms. Examples of such alkylstyrenes include o-alkylstyrene, m-alkylstyrene, p-alkylstyrene, 2,4-dialkylstyrene, 3,5-dialkylstyrene, and 2,4,6-trialkylstyrene with their alkyl groups having 1 to 8 carbon atoms, and halogenated alkylstyrenes in which one or more of the hydrogen atoms borne by the alkyl groups of the alkylstyrenes have been substituted with halogen atoms. Specific examples of the alkylstyrenes for forming the structural unit (I) include o-methylstyrene, m-methylstyrene, p-methylstyrene, 2,4-dimethylstyrene, 3,5-dimethylstyrene, 2,4,6-trimethylstyrene, o-ethylstyrene, m-ethylstyrene, p-ethylstyrene, 2,4-diethylstyrene, 3,5-diethylstyrene, 2,4,6-triethylstyrene, o-propylstyrene, m-propylstyrene, p-propylstyrene, 2,4-dipropylstyrene, 3,5-dipropylstyrene, 2,4,6-tripropylstyrene, 2-methyl-4-ethylstyrene, 3-methyl-5-ethylstyrene, o-chloromethylstyrene, m-chloromethylstyrene, p-chloromethylstyrene, 2,4-bis(chloromethyl)styrene, 3,5-bis(chloromethyl)styrene, 2,4,6-tri(chloromethyl)styrene, o-dichloromethylstyrene, m-dichloromethylstyrene, and p-dichloromethylstyrene.

The polymer block A may contain one or more units of the above-described alkylstyrenes and halogenated alkylstyrenes for forming the structural unit (I). Of these, p-methylstyrene unit is particularly preferred for use in the structural unit (I).

The proportion of the structural unit (I) in the polymer block A is 1% by mass or more, preferably 30% by mass or more, and more preferably 50% by mass or more with respect to the mass of the polymer block A in the addition polymerization-based block copolymer (a) (or the total mass of the polymer blocks A when the addition polymerization-based copolymer (a) contains two or more polymer blocks A). The polymer block A may be made entirely of the structural unit (I). If the proportion of the structural unit (I) is less than 1% by mass, then the block copolymer (a) does not exhibit sufficient compatibility with the acrylic resin (b). In the polymer block A, the structural units (I) and other aromatic vinyl compound units may be linked to one another either randomly, in blocks, in tapered blocks, or in any manner of linking.

Examples of other aromatic vinyl compound units other than the structural unit (I) that form the polymer block A include those comprising styrene, α-methylstyrene, β-methylstyrene, t-butylstyrene, monofluorostyrene, difluorostyrene, monochlorostyrene, dichlorostyrene, methoxystyrene, vinylnaphthalene, vinylanthracene, indene, and acetonaphthylene. These compounds may be present either individually or in combination or two or more units. Of these, styrene can serve as a particularly preferred aromatic vinyl compound unit.

It is particularly preferred that the polymer block A of the addition polymerization block copolymer (a) is composed only of the structural unit (I). As long as the object and advantage of the present invention are not affected, a small proportion of the polymer block A, preferably 10% by mass or less, may be composed of one or more of unsaturated monomers other than the structural unit (I) or aromatic vinyl compounds, such as those derived from butadiene, isoprene, 2,3-dimethyl-1,3-butadiene, 1,3-pentadiene, 1,3-hexadiene, isobutylene, methyl methacrylate, vinyl methyl ether, N-vinyl carbasole, β-pinene, 8,9-p-menthene, dipentene, methylene norbornene, and 2-methylene tetrahydrofuran.

Preferably, the amount of the polymer block A in the addition polymerization block copolymer (a) is in the range of 5 to 45% by mass and, more preferably, in the range of 15 to 40% by mass to ensure the rubber elasticity and the flexibility of articles molded from the polymer composition. The amount of the polymer block A in the addition polymerization block copolymer (a) can be determined by, for example, $^1$H-NMR spectroscopy.

The polymer block B of the addition polymerization-based copolymer (a) is composed essentially of a conjugated diene compound unit. Examples of the conjugated diene compounds include butadiene, isoprene, 2,3-dimethyl-1,3-butadiene, 1,3-pentadiene, and 1,3-hexadiene. The polymer block B may be composed solely of one of these compounds, or it may be composed of two or more of the compounds. The polymer block B is preferably composed of butadiene, isoprene, or a mixture of butadiene and isoprene.

When the polymer block B is composed of a conjugated diene compound, the microscopic structure of the structural units derived from the conjugated diene compounds may be of any type. For example, when the polymer block B is composed of butadiene units, preferably 5 to 90 mol %, more preferably 20 to 70 mol % of the monomer units are linked by 1,2-linkages. When the polymer block B is composed of isoprene units or butadiene units and isoprene units, preferably 5 to 80 mol %, more preferably 10 to 60 mol % of the monomer units are linked by 1,2-linkages or 3,4-linkages.

When the polymer block B is composed of two or more conjugated diene compounds (for example, butadiene and isoprene), the monomer units may be linked to one another in any manner of linking. For example, the monomer units may be linked to one another either randomly, in blocks, in tapered blocks, or in combination of two or more of these manners of linking.

When necessary, the polymer block B may contain, along with the structural unit composed of the conjugated diene compound, a small amount of structural units composed of other polymerizable monomers.

The proportion of such other polymerizable monomers is preferably 30% by mass or less and, more preferably, 10% by mass or less based on the mass of the polymer block B that forms the addition polymerization-based block copolymer (a) (or the total mass of the polymer blocks B when the addition polymerization-based copolymer (a) contains two or more polymer blocks B). Examples of the other polymerizable monomers include styrene, α-methylstyrene, and the aforementioned alkylstyrenes for forming the structural unit (I) (preferably, p-methylstyrene).

As long as the polymer block A and the polymer block B are linked to one another, they may be linked in any manner of linking, forming a straight-chained, branched or radial molecule of the addition polymerization-based block copolymer (a). Two or more of these manners of linking may be combined in one molecule. Preferably, the polymer block A and the polymer block B are linked together to form a straight-chained molecule. Examples of the straight-chained molecules include triblock copolymers as denoted by A-B-A, tetrablock copolymers as denoted by A-B-A-B and pentablock copolymers as denoted by A-B-A-B-A, given that "A" represents the polymer block A and "B" represents the polymer block B. Of these, triblock copolymers ("A-B-A") are particularly preferred because of their flexibility and readiness of the production of the addition polymerization-based block copolymer (a).

The weight average molecular weight of the addition polymerization-based block copolymer (a) needs to be in the range of 30000 to 200000 and is preferably in the range of 50000 to 150000. The addition polymerization-based block copolymer (a) with a weight average molecular weight of less than 30000 results in a decrease in the scratch resistance, abrasion resistance and mechanical properties of the articles molded from the polymer composition. In comparison, if the weight average molecular weight of the addition polymerization-based block copolymer (a) is greater than 200000, then the resulting polymer composition has a decreased moldability and the articles molded from the polymer composition have a decreased scratch resistance and decreased abrasion resistance.

The term "weight average molecular weight" as used herein refers to a weight average molecular weight as determined by gel permeation chromatography (GPC) using polystyrene standards.

As long as the object of the present invention is not affected, the addition polymerization-based block copolymer (a) may include, within or on the end of its molecule, one or more of functional groups, such as carboxyl group, hydroxyl group, acid anhydride group, amino group, and epoxy group. The addition polymerization-based block copolymer (a) may be a mixture of the addition polymerization-based block copolymer with functional groups and the addition polymerization-based block copolymer without functional groups.

The addition polymerization-based copolymer (a) can be produced, for example, by a known anionic polymerization technique. Specifically, the alkylstyrene for forming the structural unit (I), or a mixture of the alkylstyrene for forming the structural unit (I) and the aromatic vinyl compound, and the conjugated diene compound, such as butadiene and isoprene, are sequentially polymerized to form a block copolymer (i.e., non-hydrogenated form of the addition polymerization-based block copolymer (a)). Using an initiator such as an alkyllithium compound, the reaction is carried out in n-hexane, cyclohexane, or other organic solvents that are inert to the polymerization.

When necessary, the resulting block copolymer is hydrogenated. The hydrogenation reaction to obtain a hydrogenated product of the addition polymerization-based block copolymer (a) is generally carried out in a saturated hydrocarbon solvent such as cyclohexane at a reaction temperature of 20 to 100° C. under a hydrogen pressure of 0.1 to 10 MPa and requires the presence of a hydrogenation catalyst. Examples of such hydrogenation catalysts include Raney nickels; heterogeneous catalysts containing metals, such as Pt, Pd, Ru, Rh, and Ni, carried by carbon, alumina, diatomite, and other suitable carriers; Ziegler catalysts containing an organic metal compound of, for example, cobalt, nickel and other group 9 or group 10 metals, combined with an organoaluminum compound or organolithium compound, such as triethylaluminum and triisobutylaluminum; and metallocene catalysts containing a bis(cyclopentadienyl) compound of transition metals, such as titanium, zirconium, and hafnium, combined with an organic metal compound, such as lithium, sodium, potassium, aluminum, zinc, and magnesium. While the degree of hydrogenation may be adjusted depending on what physical properties are required of the polymer composition of the present invention, it is preferred that when heat resistance, weather resistance, and ozone resistance are considered particularly important, 70% or more, preferably 85% or more, and more preferably 95% or more of the carbon-carbon double bonds resulting from the conjugated diene compound units of the polymer block B for forming the block copolymer are hydrogenated.

The degree of hydrogenation of the carbon-carbon double bonds that result from the conjugated diene compound units of the polymer block B can be determined by measuring the amount of the carbon-carbon double bonds in the polymer block B before the hydrogenation reaction and the amount after the hydrogenation reaction by means of iodimetry, IR spectrophotometry, nuclear magnetic resonance or other suitable techniques and taking the difference between these amounts.

The acrylic resin (b) for use in the polymer composition of the present invention is a homopolymer of methyl methacrylate or a copolymer of methyl methacrylate (major component) and other copolymerizable monomers. Examples of the other copolymerizable monomers include acrylic acid and metal salts thereof; esters of acrylic acid, such as methyl acrylate, ethyl acrylate, n-butyl acrylate, s-butyl acrylate, t-butyl acrylate, and 2-ethylhexyl acrylate; methacrylic acid and metal salts thereof; esters of methacrylic acid, such as ethyl methacrylate, n-butyl methacrylate, s-butyl methacrylate, t-butyl methacrylate, 2-hydroxyethyl methacrylate, glycidyl methacrylate, and cyclohexyl methacrylate; vinyl acetate; aromatic vinyl compounds, such as styrene, α-methyl styrene, and p-methylstyrene; anhydrous maleic acid, and maleimide-based compounds, such as, N-methyl maleimide, N-phenyl maleimide and N-cyclohexyl maleimide. These compounds are copolymerized with methyl methacrylate either individually or in combination of two or more compounds. When methyl methacrylate is copolymerized with the other copolymerizable monomers, the other monomers are preferably present in a proportion that does not significantly affect the properties of the acrylic resin. Specifically, the other monomers are present in a proportion of 30% by mass or less and, more preferably, in a proportion of 25% by mass or less.

The acrylic resin (b) may be produced by any of commonly used polymerization techniques, such as solution polymerization, emulsion polymerization, and suspension polymerization. The acrylic resin (b) for use in the present invention may be any conventional acrylic resin. Examples include ACRYPET (brand name of Mitsubishi Rayon Co., Ltd.), DELPET (brand name of Asahi Kasei Co., Ltd.), SUMIPEX (brand name of Sumitomo Chemical Co., Ltd.), and PARA-PET (brand name of Kuraray Co., Ltd.).

The softener (c) for use in the polymer composition of the present invention may be a hydrocarbon-based oil, such as paraffin-, naphthene-, or aromatic compound-based oil; liquid paraffin; a vegetable oil, such as peanut oil and rosin; a phosphate; a low-molecular weight polyethylene glycol; a hydrocarbon-based synthetic oil, such as low-molecular weight polyethylene, ethylene-α-olefin copolymer oligomer, liquid polybutene, liquid polyisoprene or hydrogenated product thereof, and liquid polybutadiene or hydrogenated product thereof. These softeners may be used either individually or in combination of two or more softeners. Of these softeners, paraffin-based hydrocarbon oils and hydrocarbon-based synthetic oils, such as ethylene-α-olefin copolymer oligomer, are particularly suitable for use as the softener (c).

The polymer composition of the present invention contains the addition polymerization-based block copolymer (a), the acrylic resin (b), and the softener (c) in respective proportions (by mass) so that the following relationships (1) and (2) hold:

$$0.05 \leq Wb/Wa \leq 2 \quad (1)$$

$$Wc/(Wa+Wb+Wc) \leq 0.5 \quad (2)$$

where Wa, Wb, and Wc are the amounts (by mass) of the addition polymerization-based block copolymer (a), the acrylic resin (b), and the softener (c), respectively.

If the value Wb/Wa, the ratio (by mass) of the amount of the acrylic resin (b) to that of the addition polymerization-based block copolymer (a) in the polymer composition, is smaller than 0.05, then the polymer composition becomes susceptible to abrasion and scratching, as do the articles molded from the polymer composition. In comparison, if this value is larger than 2, then the polymer composition exhibits a decrease in its flexibility, rubber elasticity, and mechanical properties, as do the articles molded from the polymer composition. More preferably, the value Wb/Wa falls within the range of 0.1 to 1.6.

Furthermore, if the value Wc/(Wa+Wb+Wc), the ratio (by mass) of the amount of the softener (c) to the total amount of the addition polymerization-based copolymer (a), the acrylic resin (b), and the softener (c), is larger than 0.5, then the scratch resistance, abrasion resistance and mechanical properties of the polymer composition and the articles molded from the polymer composition will become inappropriate.

The polymer composition of the present invention, in which the addition polymerization-based copolymer (a), the acrylic resin (b), and the softener (c) are present in respective amounts that satisfy the relationships (1) and (2), has a morphology in which the addition polymerization-based block copolymer (a) forms a continuous phase (matrix) with the acrylic resin (b) dispersed throughout it, forming sea-island structure. The matrix formed of the addition polymerization-based block copolymer (a) serves to impart flexibility and high rubber elasticity to the polymer composition. The presence of the particles of the highly transparent, scratch-resistant and abrasion-resistant acrylic resin (b) throughout the matrix of the addition polymerization-based block copolymer (a) makes the moldability, transparency, scratch resistance, and abrasion resistance of the addition polymerization-based block copolymer (a) significantly higher as compared to the addition polymerization-based block copolymer (a) alone while enabling the addition polymerization-based block copolymer (a) to retain its flexibility and high rubber elasticity.

The addition polymerization-based block copolymer (a) forming the matrix and the acrylic resin (b) forming the dispersed particles in the polymer composition of the present invention can be observed by, for example, TEM.

Specifically, a 2 mm thick sheet-like article is molded from the polymer composition by injection molding or similar technique. The sheet is sliced with a microtome under cryogenic condition and the slice is stained with ruthenium acid. By observing the cross section of the slice with TEM, it can be known that the addition polymerization-based copolymer (a) forms the matrix and the acrylic resin (b) forms dispersed particles. The average size of the dispersed particles of the acrylic resin (b) can be determined by measuring the length of the major axis of micrographic image of the dispersed particles, dividing the length by the magnification of the micrograph, and taking the average for 100 particles.

As long as the object of the present invention is not affected, the polymer composition of the present invention may further contain, if necessary, a thermoplastic polymer other than the addition polymerization-based block copolymer (a) and the acrylic resin (b), a rubber reinforcing agent, or a filler.

Examples of the other thermoplastic polymers include polyolefin resins, such as various polyethylenes, various polypropylenes, ethylene-propylene random copolymers, and ethylene-vinyl acetate copolymers; styrene-based resins, such as polystyrene, poly(α-methylstyrene), poly(p-methylstyrene), and styrene-acrylonitrile copolymers; styrene-based block copolymers other than the addition polymerization-based block copolymer (a) with their hard segments containing styrene blocks; polyphenylene oxides; polycarbonates; thermoplastic polyolefin elastomers; and crosslinked thermoplastic polyolefin elastomers. These compounds may be used either individually or in combination of two or more compounds. When used is the other thermoplastic polymer, it is preferably present in the polymer composition in an amount of 10% by mass or less.

Examples of the rubber reinforcing agent or the filler include inorganic fillers, such as carbon black, calcium carbonate, talc, silica and diatomite; and organic fillers, such as rubber powder and wood filler. These agents may be used either individually or in combination of two or more agents. When used is the rubber reinforcing agent or the filler, it is preferably present in the polymer composition in an amount of 30% by mass or less.

As long as the object of the present invention is not affected, the polymer composition of the present invention may contain, if necessary, heat stabilizers, antioxidants, photostabilizers, flame retardants, blowing agents, antistats, pigments, crosslinking agents, and other additives.

The polymer composition of the present invention can be obtained by conventional techniques. For example, predetermined proportions of the addition polymerization-based block copolymer (a), the acrylic resin (b), and, if necessary, the softener (c) and other optional additives are kneaded on a kneader to obtain the polymer composition of the present invention. Examples of such kneaders include a single screw extruder, a twin screw extruder, a bunbery mixer, brabender, an open roll, and a kneader. The components are preferably kneaded at a temperature of 160 to 280° C. and, more preferably, at a temperature of 190 to 260° C.

This kneading may be performed by any of the following manners: [1] to dry-blend all of the components of the polymer composition on a mixer, such as a Henschel mixer or a tumbler, and then to knead the components at once; [2] to knead all of the components except the softener (c) and subsequently to introduce a predetermined amount of the softener (c) through a side feeder into the kneader; and [3] to knead all of the components except the acrylic resin (b) and subsequently to introduce a predetermined amount of the acrylic resin (b) through a side feeder into the kneader.

The polymer composition of the present invention can be formed into sheets, films, tubes, blow-molded articles, molded articles, or articles of various other shapes by using conventional techniques, such as extrusion molding, injection molding, blow molding, compression molding, pressing, and calendering. By using double molding technique, the polymer composition may be composed with other materials (for example, polymer materials such as polyethylene, polypropylene, olefin-based elastomer, ABS resin and polyamide, metals, wood, and cloth).

The high abrasion resistance of the polymer composition of the present invention can be demonstrated by conducting the Taber abrasion test according to JIS 6264. Specifically, a 2 mm thick sheet-like article made of a material of interest is abraded with an H-22 abrasion disk at 1000 rpm while a 1 kg load is applied. The material is determined to be substantially abrasion resistant if it gives a Taber abrasion of 100 $mm^3$ or less, preferably 50 $mm^3$ or less (See, Examples). When tested in this manner, the polymer composition of the present invention gives a Taber abrasion that falls within the specified range. Thus, the polymer composition has proven to be a desirable material since it is highly durable during use and can minimize the amount of the material used, leading to resource saving.

Accordingly, the present invention provides a polymer composition that has high moldability, flexibility, rubber elasticity, mechanical properties, and transparency in a well-balanced manner and that at the same time exhibits scratch resistance and abrasion resistance comparable to those of polyurethane-based thermoplastic elastomers or polyester-based thermoplastic elastomers.

The present invention will now be described in further detail with reference to examples, which are not intended to limit the scope of the invention in any way.

Articles were prepared from each of polymer compositions obtained according to Examples and Comparative Examples below and were measured or evaluated for the scratch resistance, transparency, rubber elasticity, flexibility, mechanical properties, and moldability. The measurement and evaluation were made according to the following procedures:

a) Scratch Resistance

A 5 cm long×11 cm wide×0.2 cm thick sample piece was prepared from a sheet made of each of the polymer compositions obtained in Examples 1 through 8 and Comparative Examples 1 through 7. According to ASTM D2197, the sample piece was scratched with a needle-like probe for the crosscut test at a speed of 1 cm/sec while a 200 g load was applied to the needle. The depth of the scratch was measured by a surface roughness meter. A shallower scratch indicates that the sample has a higher scratch resistance.

b) Abrasion Resistance

A 11 cm long×11 cm wide×0.2 cm thick sample piece was prepared from a sheet made of each of the polymer compositions obtained in Examples 1 through 8 and Comparative Examples 1 through 7. According to JIS K 6264, the sample piece was abraded with an H-22 abrasion disk at 1000 rpm while a 1 kg load was applied, and the Taber abrasion was measured.

c) Transparency

A 11 cm long×11 cm wide×0.2 cm thick sample piece was prepared from a sheet made of each of the polymer compositions obtained in Examples 1 through 8 and Comparative Examples 1 through 7. The absorption spectrum of the sample piece in the visible range was determined and was used to determine the light transmission. A higher light transmission indicates that the sample has a higher transparency.

d) Rubber Elasticity

A No. 1 dumbbell-shaped sample piece was stamped out of a sheet made of each of the polymer compositions obtained in Examples 1 through 8 and Comparative Examples 1 through 7. According to JIS K 6262, the sample piece was stretched by 100% and was held stretched for 24 hours. Subsequently, the sample was released and the permanent tension set was measured as an index of the rubber elasticity. A smaller permanent tension set indicates that the sample has a higher rubber elasticity.

e) Flexibility (Hardness)

A 11 cm long×11 cm wide×0.2 cm thick sample piece was prepared from a sheet made of each of the polymer compositions obtained in Examples 1 through 8 and Comparative Examples 1 through 7. According to JIS K 6253, the hardness of the sample piece was measured by a Type-A durometer as an index of the flexibility.

f) Mechanical Property

A No. 5 dumbbell-shaped sample piece was stamped out of a sheet made of each of the polymer compositions obtained in Examples 1 through 8 and Comparative Examples 1 through 7. The sample piece was subjected to a tensile test according to JIS K 6251 to determine the tensile strength at break and the elongation at break as indices of the mechanical property.

g) Moldability

Pellets were prepared from each of the polymer compositions obtained in Examples 1 through 8 and Comparative Examples 1 through 7. According to JIS K 7210, the melt flow rate (MFR) of the pellets at 230° C. under a 2.16 kg load was determined. A higher MFR indicates that the sample has a higher moldability.

The components used in the polymer compositions of Examples and Comparative Examples below are as follows:
(a) Addition Polymerization-based Block Copolymer

POLYMERIZATION EXAMPLE 1

50 kg cyclohexane and a 265 ml cyclohexane solution of sec-butyl lithium (11% by mass) were placed in a pressure vessel equipped with a stirrer. To this solution, 2.25 kg of p-methylstyrene were added over a 30-minute period and the polymerization was allowed to proceed at 50° C. for 120 minutes. Following the addition of 80 g tetrahydrofuran (THF), 10.5 kg of butadiene were added over a 60-minute period and the polymerization was allowed to proceed at 50° C. for 30 minutes. Additional 2.25 kg of p-methylstyrene were added over a 30-minute period and the polymerization was allowed to proceed at 50° C. for 30 minutes. This gave a reaction mixture containing a poly p-methylstyrene-polybutadiene-poly p-methylstyrene triblock copolymer. The resulting block copolymer had a number average molecular weight of 76400, and the amount of p-methylstyrene as determined by $^1$H-NMR was 30% by mass.

To the resulting reaction mixture containing the block copolymer, a hydrogenation catalyst, which was separately prepared by adding 400 g of triisopropylaluminum (20% by mass, cyclohexane solution) to 130 g of nickel octanoate (64% by mass, cyclohexane solution), was added, and the hydrogenation reaction was allowed to proceed at 80° C. in a hydrogen atmosphere of 1 MPa. This gave a hydrogenated product of the poly p-methylstyrene-polybutadiene-poly p-methylstyrene triblock copolymer (The product is referred to as "block copolymer 1," hereinafter). The resulting block copolymer 1 had a number average molecular weight of 77000, and the amount of p-methylstyrene and the degree of hydrogenation as determined by $^1$H-NMR were 29% by mass and 97%, respectively.

POLYMERIZATION EXAMPLE 2

50 kg cyclohexane and a 265 ml cyclohexane solution of sec-butyl lithium (11% by mass) were placed in a pressure vessel equipped with a stirrer. To this solution, 2.25 kg of a mixture of p-methylstyrene and styrene (p-methylstyrene/styrene=50/50 (by mass)) were added over a 30-minute period and the polymerization was allowed to proceed at 50° C. for 120 minutes. Following the addition of 80 g THF, 10.5 kg of butadiene were added over a 60-minute period and the polymerization was allowed to proceed at 50° C. for 30 minutes. Additional 2.25 kg of a mixture of p-methylstyrene and styrene (p-methylstyrene/styrene=50/50 (by mass)) were added over a 30-minute period and the polymerization was allowed to proceed at 50° C. for 30 minutes. This gave a reaction mixture containing a poly(p-methylstyrene/styrene)-polybutadiene-poly(p-methylstyrene/styrene) block copolymer. The resulting block copolymer had a number average molecular weight of 76400, and the total amount of p-methylstyrene and styrene as determined by $^1$H-NMR was 30% by mass.

To the resulting reaction mixture containing the block copolymer, a hydrogenation catalyst, which was separately prepared by adding 400 g of triisopropylaluminum (20% by mass, cyclohexane solution) to 130 g of nickel octanoate (64% by mass, cyclohexane solution), was added, and the hydrogenation reaction was allowed to proceed at 80° C. in a hydrogen atmosphere of 1 MPa. This gave a hydrogenated product of the poly(p-methylstyrene/styrene)-polybutadiene-poly (p-methylstyrene/styrene) triblock copolymer (The product is referred to as "block copolymer 2," hereinafter). The resulting block copolymer 1 had a number average molecular weight of 77000, and the total amount of p-methylstyrene and styrene and the degree of hydrogenation as determined by $^1$H-NMR were 29% by mass and 97%, respectively.

POLYMERIZATION EXAMPLE 3

50 kg cyclohexane and a 265 ml cyclohexane solution of sec-butyl lithium (11% by mass) were placed in a pressure vessel equipped with a stirrer. To this solution, 2.25 kg of styrene were added over a 30-minute period and the polymerization was allowed to proceed at 50° C. for 120 minutes. Following the addition of 80 g THF, 10.5 kg of butadiene were added over a 60-minute period and the polymerization was allowed to proceed at 50° C. for 30 minutes. Additional 2.25 kg of styrene were added over a 30-minute period and the polymerization was allowed to proceed at 50° C. for 30 minutes. This gave a reaction mixture containing a polystyrene-polybutadiene-polystyrene triblock copolymer. The resulting block copolymer had a number average molecular weight of 76400, and the amount of styrene as determined by $^1$H-NMR was 30% by mass.

To the resulting reaction mixture containing the block copolymer, a hydrogenation catalyst, which was separately prepared by adding 400 g of triisopropylaluminum (20% by mass, cyclohexane solution) to 130 g of nickel octanoate (64% by mass, cyclohexane solution), was added, and the hydrogenation reaction was allowed to proceed at 80° C. in a hydrogen atmosphere of 1 MPa. This gave a hydrogenated product of the polystyrene-polybutadiene-polystyrene triblock copolymer (The product is referred to as "block copolymer 3," hereinafter). The resulting block copolymer 3 had a number average molecular weight of 77000, and the amount of styrene and the degree of hydrogenation as determined by $^1$H-NMR were 29% by mass and 97%, respectively.

(b) Acrylic Resin

POLYMERIZATION EXAMPLE 4

500 g pure water was placed in a 1000 ml three-necked flask equipped with a reflux condenser tube, and the atmosphere in the flask was thoroughly replaced with nitrogen. Subsequently, a mixture of 425 g methyl methacrylate, 55 g methyl acrylate, 2.5 g lauryl peroxide, and 4 g lauryl mercaptan was added and the polymerization was allowed to proceed at 80° C. for 4 hours. This gave an acrylic resin (which is referred to as "acrylic resin 1," hereinafter). The intrinsic viscosity of the acrylic resin 1 determined in chloroform at 20° C. was 0.301 dl/g.

(c) Softener

DIANA PROCESS PW-380 (A paraffin-based processed oil manufactured by Idemitsu Petrochemical Co., Ltd.)

EXAMPLES 1 THROUGH 8

(1) In each example, the block copolymer 1 or the block copolymer 2, the acrylic resin 1, and the softener were mixed together on a Henschel mixer in respective proportions shown in Table 1 below. The mixture was fed to a twin screw extruder (TEM-35B, Toshiba Machine Co., Ltd.), where it was kneaded at 230° C. and was then extruded into strands. The strands were cut into pellets made of one of the respective polymer compositions. The MFR of each composition as determined in the manner described above is shown in Table 1 below.

(2) Each of the pellet-form polymer compositions obtained in (1) above was pressed into a 0.2 cm thick sheet (press temperature=230° C., press pressure=10 MPa, and press time=3 min). The sheet was then measured for its scratch resistance, abrasion resistance, transparency, rubber elasticity, flexibility, and mechanical properties in the manner described above. The results are shown in Table 1 below.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Polymer composition (Parts by mass) (a) addition polymerization-based block copolymer | | | | | | | | |
| Block copolymer 1 | 70 | 54 | 40 | 36 | 47 | 42 | 65 | |
| Block copolymer 2 | | | | | | | | 70 |
| (b) Acrylic resin | | | | | | | | |
| Acrylic resin 1 | 30 | 36 | 55 | 54 | 47 | 43 | 20 | 30 |
| (C) Softener | | | | | | | | |
| DIANA PROCESS PW-380 | | 10 | 5 | 10 | 6 | 15 | 15 | |
| Irganox 1010* | 0.25 | 0.25 | 0.25 | 0.25 | 0.25 | 0.25 | 0.25 | 0.25 |
| Scratch resistance (μm) | 1.7 | 2.0 | 5.4 | 4.8 | 2.6 | 2.3 | 5.9 | 3.1 |
| Taber abrasion (mm³) | 33 | 28 | 39 | 27 | 14 | 16 | 34 | 49 |
| Light transmission (%) | 87 | 82 | 88 | 83 | 82 | 82 | 85 | 84 |
| Permanent set (%) | 1.2 | 1.5 | 3.8 | 1.0 | 6.4 | 1.8 | 0.9 | 1.8 |
| Hardness (Type A) | 80 | 70 | 90 | 80 | 74 | 70 | 60 | 81 |
| Tensile strength at break (MPa) | 27 | 23 | 25 | 20 | 15 | 14 | 26 | 24 |
| Elongation at break (%) | 350 | 280 | 260 | 210 | 240 | 270 | 420 | 320 |
| MFR (g/10 min) | 1.3 | 11 | 5.5 | 13 | 9.5 | 55 | 49 | 1.5 |

*Irganox1010: Hindered phenol-based antioxidant (Ciba Specialty Chemicals Co., Ltd.)

COMPARATIVE EXAMPLES 1 THROUGH 7

In each example, the block copolymer 1 or the block copolymer 3, the acrylic resin 1, and the softener were mixed together on a Henschel mixer in respective proportions shown in Table 2 below. The mixture was fed to a twin screw extruder (TEM-35B, Toshiba Machine Co., Ltd.), where it was kneaded at 230° C. and was then extruded into strands. The strands were cut into pellets made of one of the respective polymer compositions. The MFR of each composition as determined in the manner described above is shown in Table 2 below.

(2) Each of the pellet-form polymer compositions obtained in (1) above was pressed into a 0.2 cm thick sheet (press temperature=230° C., press pressure=10 MPa, and press time=3 min). The sheet was then measured for its scratch resistance, abrasion resistance, transparency, rubber elasticity, flexibility, and mechanical properties in the manner described above. The results are shown in Table 2 below.

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Polymer composition (Parts by mass) (a) addition polymerization-based block copolymer | | | | | | | |
| Block copolymer 1 | 30 | 24 | 70 | 27 | | | |
| Block copolymer 3 | | | | | 70 | 47 | 54 |
| (b) Acrylic resin | | | | | | | |
| Acrylic resin 1 | 70 | 56 | | 18 | 30 | 47 | 36 |
| (C) Softener | | | | | | | |
| DIANA PROCESS PW-380 | | 20 | 30 | 55 | | 6 | 10 |
| Irganox 1010 | 0.25 | 0.25 | 0.25 | 0.25 | 0.25 | 0.25 | 0.25 |
| Scratch resistance (μm) | 16 | 23 | 11 | 22 | 11 | 12 | 12 |
| Taber abrasion (mm³) | 230 | 310 | 320 | >500 | 410 | 350 | 450 |
| Light transmission (%) | 79 | 82 | 81 | 82 | 83 | 84 | 88 |
| Permanent set (%) | Rupture | 6.5 | 5.0 | 7.2 | 4.7 | 5.0 | 4.0 |
| Hardness (Type A) | 97 | 83 | 37 | 10 | 85 | 75 | 70 |
| Tensile strength at break (MPa) | 4.8 | 8.3 | 14 | 4.5 | 15 | 15 | 13 |
| Elongation at break (%) | 180 | 200 | 650 | 600 | 300 | 210 | 260 |
| MFR (g/10 min) | 48 | >100 | 64 | >100 | 0.6 | 2.8 | 1.9 |

*Irganox1010: Hindered phenol-based antioxidant (Ciba Specialty Chemicals Co., Ltd.)

REFERENCE EXAMPLE 1

A polyurethane-based thermoplastic elastomer (KURAMIRON U3190, trade name of Kuraray Co., Ltd.) alone was pressed into a 0.2 cm thick sheet (press temperature=200° C., press pressure=10 MPa, and press time=3 min). The sheet was then measured/evaluated for its scratch resistance, and abrasion resistance in the same manner as described above. The results are as shown in Table 3 below.

REFERENCE EXAMPLE 2

A polyester-based thermoplastic elastomer (HYTREL 4057, trade name of Toray Dupont Co., Ltd.) alone was pressed into a 0.2 cm thick sheet (press temperature=200° C., press pressure=10 MPa, and press time=3 min). The sheet was then measured/evaluated for its scratch resistance, and abrasion resistance in the same manner as described above. The results are as shown in Table 3 below.

TABLE 3

| Type of elastomer | Ref. Ex. 1 Polyurethane-based thermoplastic elastomer[1] | Ref. Ex. 2 Polyester-based thermoplastic elastomer[2] |
|---|---|---|
| Scratch resistance (μm) | 1.0 | 5.8 |
| Taber abrasion (mm$^3$) | 6 | 33 |

[1]KURAMIRON U3190, trade name of Kuraray Co., Ltd.
[2]HYTREL 4057, trade name of Toray Dupont Co., Ltd.

The results of Table 1 indicates that each of the polymer compositions of Examples 1 through 8, which each contain the block copolymer 1 or the block copolymer 2 and the acrylic resin 1 in proportions (by mass) that satisfy the relationship (1) and the softener in a proportion (by ratio) that satisfies the relationship (2), exhibits moldability, high scratch resistance, and high abrasion resistance and at the same time shows transparency, rubber elasticity, flexibility, and mechanical properties in a well-balanced manner.

In comparison, the polymer composition of Comparative Example 1, in which the ratio (by mass) of the acrylic resin 1 to the block copolymer 1 is 2.34, a value falling outside the range specified by the relationship (1), exhibits poor rubber elasticity and poor flexibility and shows a decrease in its scratch resistance, abrasion resistance, and mechanical properties.

The polymer composition of Comparative Example 2, in which the softener is present in an amount that satisfies the relationship (2) but the ratio (by mass) of the acrylic resin 1 to the block copolymer 1 is 2.34, the same value as in Comparative Example 1, falling outside the range specified by the relationship (1), shows a decrease in its scratch resistance, abrasion resistance, and mechanical properties.

The polymer composition of Comparative Example 3, in which the ratio (by mass) of the acrylic resin 1 to the block copolymer 1 is 0, exhibits decreased scratch resistance and decreased abrasion resistance.

The polymer composition of Comparative Example 4, in which the proportion (by mass) of the softener falls outside the range specified by the relationship (2), shows decreased scratch resistance, decreased abrasion resistance, and decreased mechanical property.

Each of the polymer compositions of Comparative Examples 5 through 7, in which the polymer block A to compose the block copolymer 3 is polystyrene, exhibits poor scratch resistance, poor abrasion resistance, and poor mechanical properties, although the ratio (by mass) of the acrylic resin 1 to the block copolymer 3 falls within the range specified by the relationship (1) and the ratio (by mass) of the softener falls within the range specified by the relationship (2).

INDUSTRIAL APPLICABILITY

Not only does the polymer composition of the present invention offer various advantageous properties, including moldability, flexibility, rubber elasticity, mechanical properties, and transparency, but it also exhibits superior scratch resistance and superior abrasion resistance. These properties makes the polymer composition of the present invention suitable for use in a wide range of applications, including exterior/interior parts of automobiles, such as bumpers, side moldings, weather strips, mattress guards, emblems, leather sheets, floor mattresses, arm rests, airbag covers, steering wheel covers, beltline moldings, and flash mount moldings; parts of home electric appliances, such as gaskets for refrigerators, hoses for washing machines, bumpers for vacuum cleaners, protective films and waterproof bodies for cellular phones; parts of office appliances, such as feeder rollers and winding rollers for photocopiers; furniture, such as sofas and chair sheets; parts, such as switch covers, casters, stoppers and foot rubbers; footgear; construction materials, such as coated steel plates and coated plywood; sports equipment, such as swimming goggles, snorkels and grips of skipoles; medical instruments, such as syringe gaskets and rolling tubes; industrial parts, such as conveyor belts, electric belts, and pelletizer rolls; stretchable materials, such as diapers, liniments, and bandages; stationery; toys; and articles of daily use.

The invention claimed is:

1. A polymer composition containing an addition polymerization-based block copolymer (a), an acrylic resin (b), and a softener (c), wherein the addition polymerization-based block copolymer (a) has a weight average molecular weight of 30000 to 200000 and is at least one selected from block copolymers comprising at least one polymer block A and at least one polymer block B; the polymer block A comprises mainly an aromatic vinyl compound unit wherein at least 30% by mass of the aromatic vinyl compound units are alkylstyrene-derived structural units (I) in which at least one alkyl group having 1 to 8 carbon atoms is bound directly to a benzene ring; the polymer block B comprises a conjugated diene compound unit, wherein 70% or more of carbon-carbon double bonds resulting from the conjugated diene compound units of the polymer block B are hydrogenated; and the components of the polymer composition are present in respective proportions (by mass) so that the following relationships (1) and (2) hold:

$$0.05 \leq Wb/Wa \leq 2 \tag{1}$$

$$0 \leq Wc/(Wa+Wb+Wc) \leq 0.5 \tag{2}$$

where Wa, Wb, and Wc are the amounts (by mass) of the components of the polymer composition: the addition polymerization-based block copolymer (a), the acrylic resin (b) and the softener (c), respectively, wherein the polymer composition has a sea-island morphology;

wherein the acrylic resin (b) is a homopolymer of methyl methacrylate or a copolymer of methyl methacrylate and one or more copolymerizable monomers selected from the group consisting of acrylic acid, metal salts of acrylic acid, acrylic acid esters, methacrylic acid, metal salts of methacrylic acid, methacrylic acid esters, vinyl acetate, aromatic vinyl compounds and maleimide compounds; and wherein the polymer composition, when formed into a 2 mm thick sheet-shaped article and tested for the Taber abrasion according to JIS K 6264, gives a Taber abrasion of 100 mm$^3$ or less, the test conducted by abrading the sheet with an H-22 abrasion disk at 1000 rpm while applying a 1 kg load.

2. The polymer composition of claim 1, wherein the alkyl-styrene-derived structural unit comprises units from an alkylstyrene selected from the group consisting of o-alkylstyrene, m-alkylstyrene, p-alkylstyrene, 2,4-dialkylstyrene, 3,5-dialkylstyrene, 2,4,6-trialkylstyrene, and halogenated alkylstyrenes in which one or more of the hydrogen atoms borne by the alkyl groups of the alkylstyrenes have been substituted with halogen atoms.

3. The polymer composition of claim 1, wherein the alkylstyrene-derived structural unit comprises units from an alkylstyrene selected from the group consisting of o-methylstyrene, m-methylstyrene, p-methylstyrene, 2,4-dimethylstyrene, 3,5-dimethylstyrene, 2,4,6-trimethylstyrene, o-ethylstyrene, m-ethylstyrene, p-ethylstyrene, 2,4-diethylstyrene, 3,5-diethylstyrene, 2,4,6-triethylstyrene, o-propylstyrene, m-propylstyrene, p-propylstyrene, 2,4-dipropylstyrene, 3,5-dipropylstyrene, 2,4,6-tripropylstyrene, 2-methyl-4-ethylstyrene, 3-methyl-5-ethylstyrene, o-chloromethylstyrene, m-chloromethylstyrene, p-chloromethylstyrene, 2,4-bis(chloromethyl)styrene, 3,5-bis(chloromethyl)styrene, 2,4,6-tri(chloromethyl)styrene, o-dichloromethylstyrene, m-dichloromethylstyrene, and p-dichloromethylstyrene.

4. The polymer composition of claim 1, wherein the conjugated diene compound is a member selected from the group consisting of butadiene, isoprene, 2,3-dimethyl-1,3-butadiene, 1,3-pentadiene, and 1,3-hexadiene.

5. The polymer composition of claim 1, wherein the alkylstyrene-derived structural unit (I) is present in polymer block (A) in an amount of at least 50% by mass.

* * * * *